April 3, 1962
G. O. CONNER
3,027,577
ROTARY TOOL TURRET CARRYING A ROTARY THREADING TOOL
SPINDLE WITH RADIALLY MOVABLE DIES ACTUATED
BY ROTATION OF THE TOOL TURRET
Original Filed March 12, 1951
4 Sheets-Sheet 1
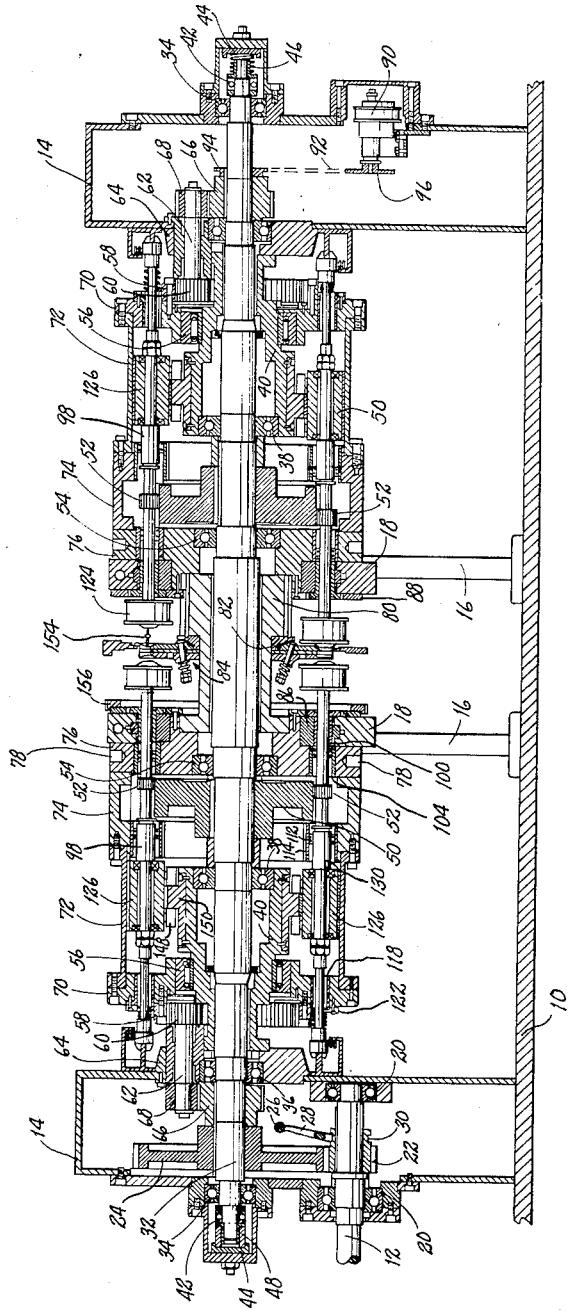
FIG. I.
INVENTOR.
GUY O. CONNER
BY
W. H. Woodlief
ATTORNEY

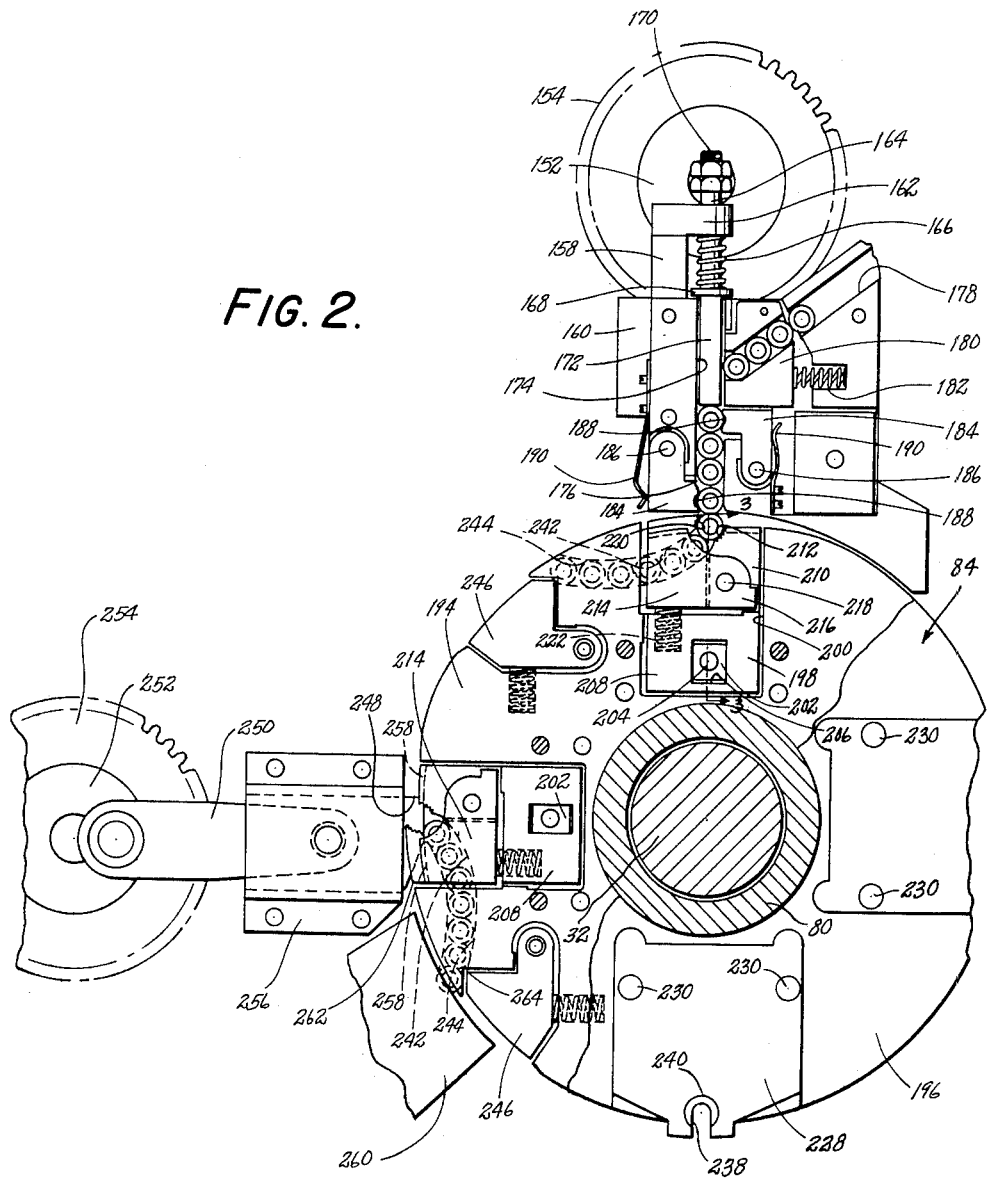

April 3, 1962 G. O. CONNER 3,027,577
ROTARY TOOL TURRET CARRYING A ROTARY THREADING TOOL
SPINDLE WITH RADIALLY MOVABLE DIES ACTUATED
BY ROTATION OF THE TOOL TURRET
Original Filed March 12, 1951 4 Sheets-Sheet 3

INVENTOR.
GUY O. CONNER
BY
W. H. Woodlief
ATTORNEY

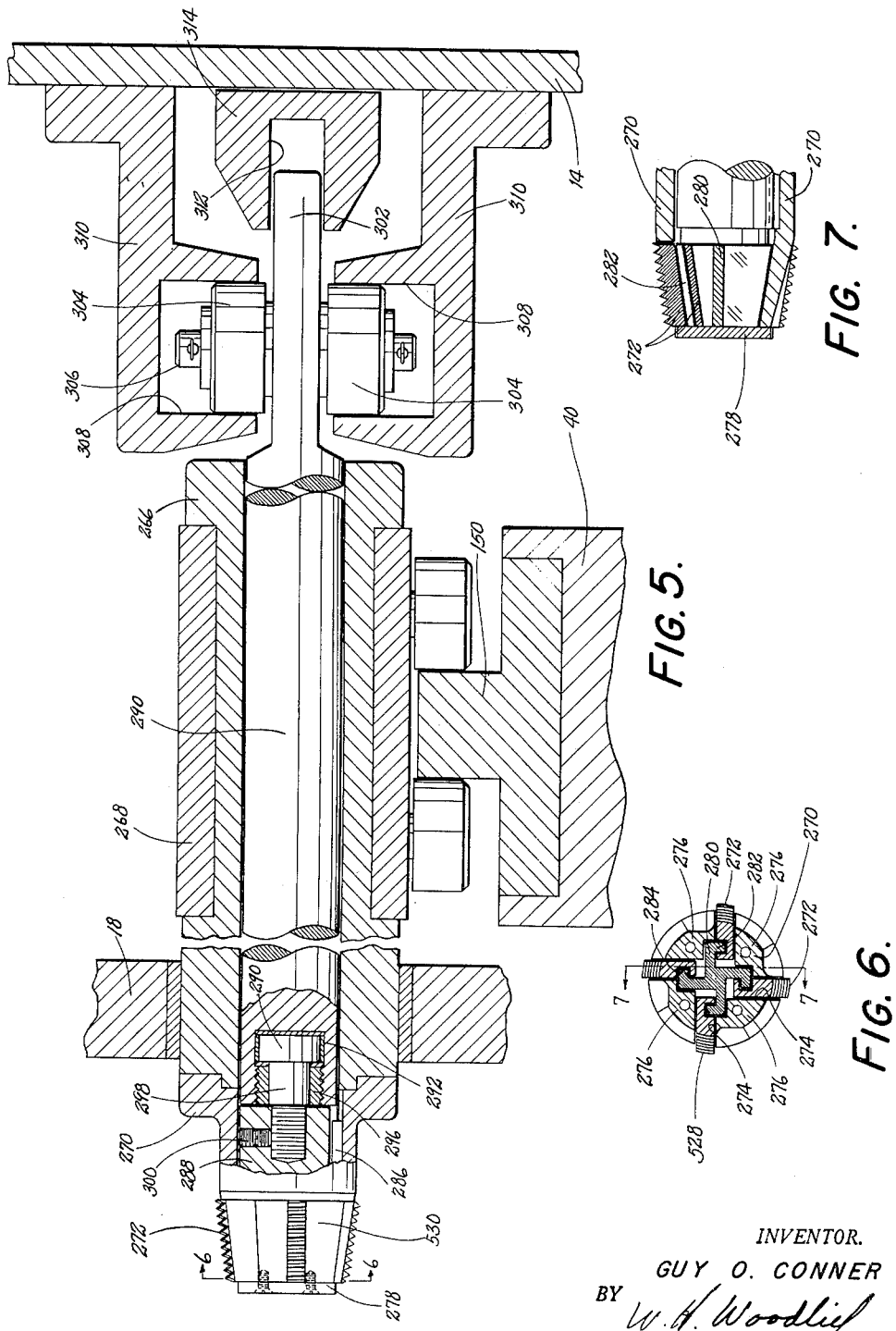

United States Patent Office 3,027,577
Patented Apr. 3, 1962

3,027,577
ROTARY TOOL TURRET CARRYING A ROTARY THREADING TOOL SPINDLE WITH RADIALLY MOVABLE DIES ACTUATED BY ROTATION OF THE TOOL TURRET
Guy O. Conner, Cleveland, Ohio, assignor to Republic Steel Corporation, Cleveland, Ohio, a corporation of New Jersey
Original application Mar. 12, 1951, Ser. No. 215,131, now Patent No. 2,828,492, dated Apr. 1, 1958. Divided and this application Mar. 25, 1958, Ser. No. 723,879
4 Claims. (Cl. 10—145)

This invention relates to a work holder for metal working machines. More particularly, the invention relates to rotary work holding turrets adapted for use in a metal working machine of the kind shown in my United States Patent Number 2,828,492, dated April 1, 1958, for Nut Tapping Machine Having Releasable Tap Holding Means to Discharge Tapped Nuts Therefrom, of which this application is a division.

It is an object of this invention to provide a work holding mechanism for machine tools, which is particularly adapted to accommodate tubular workpieces such that metal working tools may perform work on the inner surfaces of the workpieces.

It is a further object of this invention to provide a work holder of the indicated class in combination with a metal working tool adapted to form internally tapered threads on the workpieces.

It is still a further object of this invention to provide a disk-like rotary work holder for metal working machines having a plurality of work holding clamps spaced about the circumference thereof, together with means for automatically loading workpieces into the work holding clamps and automatically discharging finished workpieces therefrom.

These objects and attendant advantages will become clear as the following description of the invention is read and other objects and advantages will appear from a reading of the specification in conjunction with the drawings forming a part of this application, in which drawings like reference numerals indicate like parts, and in which:

FIG. 1 is a longitudinal medial sectional view through a machine in which the feature of the invention herein may be embodied, said machine being an embodiment of the invention of my aforesaid patent;

FIG. 2 is a partial elevational view of a work holding mechanism with portions removed to show underlying parts;

FIG. 5 is a longitudinal sectional view through a spindle especially adapted for cutting tapered threads;

FIG. 6 is a sectional view along line 6—6 of FIG. 5; and

FIG. 7 is a partial sectional view along line 7—7 of FIG. 6.

Figure 4:
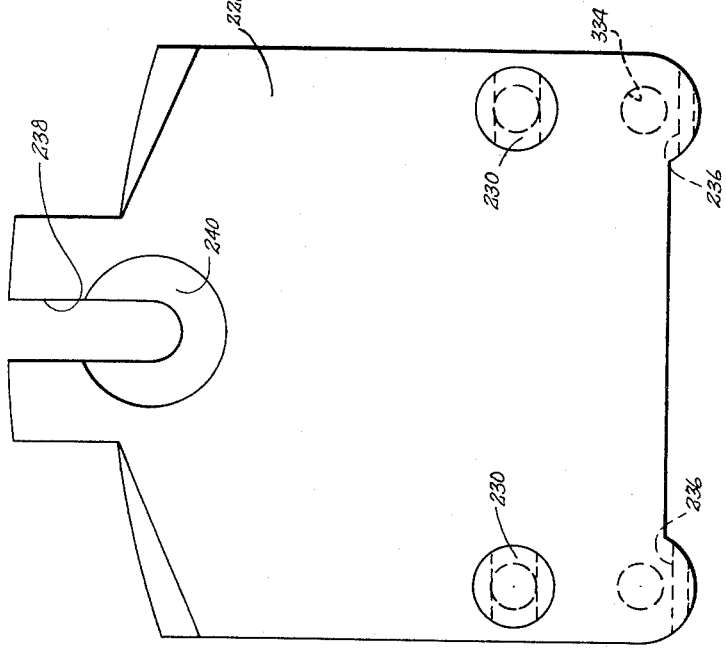
FIG. 4 is an elevational view of a clamping member and its associated parts used in the work holder of FIG. 2.

In the drawings, I have used the character 10 to designate the base on which the machine is mounted. A main drive motor (not shown) is mounted at one end of the base and is connected to a drive shaft 12 by a suitable coupling. The supporting structure for the machine includes end standards 14 which comprise not only end supports for the machine but also housings for the gear drives and certain auxiliary equipment as will appear later. Auxiliary supports 16 for the center section are also mounted on the base 10. The supports 16 are merely legs carrying guide members 18. When the machine is in operation, suitable covers are employed to enclose the mechanism.

As is best shown in FIG. 1, the drive shaft 12 is journalled in ball bearings 20, in the left hand standard 14. A pinion 22 is mounted on the shaft 12 and is splined thereto such that it may be moved into or out of engagement with a gear 24 by manipulating a lever and associated shifting mechanism. This mechanism is a simple fork shifting arrangement comprising a shaft 26 to which is fixed a shifting fork 28. This fork engages a groove 30 in a collar on the pinion 22 in a manner well known in the art and thus is adapted to shift the pinion into and out of driving engagement with the gear 24.

The drive from the pinion is normally transmitted to the gear 24 and thence to a main drive shaft 32. The shaft 32 is journalled near its end in end bearings 34 in the outer walls of both standards 14 and also in near end bearings 36 in the inner walls. Still further support is provided approximately midway between the center of the shaft and both ends by near center bearings 38 mounted in central stationary members 40. These latter members are bolted or otherwise suitably mounted on the inner walls of the standard 14 at both ends. Thus the shaft is supported by six bearings. Firm support such as this is necessary because the shaft is the sole support of nearly all of the operating mechanism of the machine. Furthermore, such support will help to prevent whipping of the long shaft. A thrust bearing 42 is provided at each end of the shaft. Adjustable cupped members 44 are fixed to the standards 14 and on one end adjust the compressive force of a spring 46. A spacer 48 is substituted for the spring 46 on the other end, but in other respects the devices on both ends are the same.

A pair of large "bull" or sun gears 50 are keyed to the shaft adjacent to and inboard of the near center bearings 38. These gears are the sun gears for two symmetrical planetary gear systems formed by planetary pinions 52 carried about the sun gears 50 by an irregular shaped drum supported partly on the shaft by center bearings 54 and partly on the stationary members 40 by roller bearings 56. This drum is driven from both ends through internal ring gears 58, driven by pinions 60. The pinions 60 in turn are keyed to similar countershafts 62 journalled in bearing brackets 64 mounted on the inner wall of the standards 14. These countershafts 62 are driven by the main shaft 32 through gears 66 keyed to the main shaft and meshing with gears 68 on the countershafts 62.

The main drum is substantially symmetrical end-for-end, except directly at its center. The ring gears 58 are mounted on end plates 70 which also support the roller bearings 56. These end plates 70 are connected to the rest of the drum by cover members 72 which may conveniently be bolted to the end plates 70 and to spindle supporting members 74. The spindle supporting members 74 are fastened to inner wall members 76 on both sides of the center section of the machine. Holes 78 may be provided in the wall member 76 into which a bar may be inserted for turning the machine by hand if desired. The wall members 76 hold the center bearings 54 and so help to support the drum. A center hub 80 joins the wall members from both sides and completes the basic structure of the rotating drum. The hub 80 is the only part of the drum assembly which is not symmetrical, being formed with a shoulder 82 to which a face plate and clamping or work holding mechanism 84 is fastened. The work holding mechanism specifically disclosed herein constitutes an important modification of the corresponding work holding mechanism 84 of FIG. 1 and it will, therefore, be dealt with in detail at a later point herein. A second spindle support member 86 may be bolted or otherwise fastened to the wall members 76 on each drum, and a cover plate 88 may be used to cover the complete end of the assembly. The cover 88 and spindle support 86 slide freely relative to the guide member 18 and are particularly useful to provide proper lubrication and flushing of chips.

A small oil pump 90 may be mounted in one of the end supports 14 to provide lubrication for the gears and bearings in that support. The pump is driven by a chain 92 engaged with a sprocket 94 on the main shaft and driving a sprocket 96 on the pump shaft. A sump may be formed in the base of the support to catch the oil and supply it to the intake side of the pump 90.

Eight spindles are mounted on each side of the present embodiment and these spindles are driven by the meshing engagement of the bull gears 50 with the pinions 52 on the spindles of FIG. 1. Each of the spindles is adapted for longitudinal as well as rotary motion, thus being adapted to carry driving heads which drive a tool in a rotary motion while feeding it through a nut blank, or other workpiece, and then following discharge of the finished nut, the heads carried by the spindles return the tool to its original position. It will be apparent that, while the shaft 32 is rotating in one direction, the spindle-carrying drum device will be driven in the opposite direction because of the internal gear drive at the ends of the drum. Thus, the pinions 52 are carried around the bull gears 50 in a planetary manner and consequently are driven at a comparatively high speed. The pinions 52 may be formed as a part of the spindle 98 itself or may be suitably fixed thereto. It will be apparent that the direction of rotation of any or all of the spindles could be reversed by use of an idler gear between the pinion 52 and the bull gear 50. This might be useful in an operation where it was desired that the spindles on one side rotate in a direction opposite to that of the spindles on the other side. The spindles 98 extend through four of the individual members of the rotating drum. The inner ends of the spindles are journalled in a bronze bearing bushing 100 pressed into the support member 86. Suitable packing is provided between the cover 88 and the flange of the bushing to keep dirt and chips isolated from the bearings within the drum member, and to keep cutting fluid and the like within the bushing as will appear hereinafter.

The spindle 98 next passes through the end wall member 76. At this point, a hardened steel bushing 104 is pressed into the member. The surface of the spindle adjacent this bushing is also hardened. A form of ball bearing which will journal the shaft both for rotational and longitudinal motion is provided in the space between the bushing and the spindle. In addition to the rotary motion of a regular ball bearing, the spindle can move longitudinally, rolling the balls of the bearing on the bushing 104. A second bearing 112 is located in an inwardly extending, wide flange 114 formed in the spindle support member 74. This bearing also includes a hardened bushing pressed into an opening in the flange 114 as a race for the bearing. The third bearing 118 includes a bushing pressed into the end plate 70 and on which the bearing may roll. A cover plate 122 may be provided at this end to protect the bearings and retain grease.

At its end nearest the center of the machine, each spindle carries a tool holding head 124. The pinion 52 is located between the first and second bearings 104 and 112, and a follower block 126 which controls the longitudinal movement of the spindle is located between the second and third bearings. The spindles are journalled in the follower block by two commercial angular contact ball bearings, one at each end of the block. A fixed position of the spindle relative to the block is maintained by engagement of one of the bearings with a shoulder 130 on the spindle against which the bearing is held by the pressure of a nut 132 against the other bearing. This nut is threaded on the spindle shaft.

The follower block 126 is an irregularly shaped block having two rollers 148 on each block. The rollers 148 may be standard anti-friction bearings mounted on headed pins threaded or otherwise held in the block. They are spaced apart just far enough to straddle a cam ridge 150 formed on cam segment blocks which are held in the stationary part 40 of the support for the machine. Thus, while the rollers straddle the cam ridge 150, of this drum cam, they will translate any change in the location of that ridge into longitudinal motion of the spindle. Movement of the spindles 98 by the drum cam is effective to carry the heads 124 toward and away from each other and thereby to drive a tool 154 through the blank. Resort may be had to my above-noted application for patent for a more detailed disclosure of the foregoing mechanism.

The invention herein finds particular use in the threading of pipe couplings. For the threading of pipe couplings with straight (not tapered) threads, it is possible to use a relatively simple clamping device for the workpieces, and a related threading tool, both of which are shown herein as substitutes for the work holding mechanism 84 and the spindles 98, respectively, of FIG. 1. One form of clamping device suitable for threading pipe couplings is disclosed in FIGS. 2–4. In this embodiment, only four spindles are used and, therefore, four clamps are equally spaced on the work holding disk. A novel workpiece injector and a novel work ejecting mechanism are associated with the clamping device.

The workpiece injector (FIG. 2) includes a wheel 152, driven by a pinion 154, which, in turn, is driven by a ring gear 156 (FIG. 1). In the present embodiment, the gear ratio would be four to one, since four spindles are used.

A plunger member 158 is attached to the wheel 152 by an appropriate crank mechanism to cause the plunger to reciprocate vertically in a guide member 160. The plunger is formed with an offset arm 162 in which is journalled a ram 164. A spring 166, surrounding the ram and engaged between a collar 168 thereon and the arm 162, presses the ram downward. A nut and jam nut arrangement 170 limits the movement of the ram. An extending part 172 of the ram operates in a channel 174 to push the workpiece 176 into the work holders.

The workpieces enter the injector through a chute 178 extending from a hopper or a feed control mechanism such as that shown in my concurrently filed application for United States Patent, Serial Number 723,891, for Blank Feeding Device for Metal Working Machines. From the chute, the pieces pass to a pivoted entry piece 180 urged to its normal position by a spring 182.

Spring loaded detent arrangements are used to assure the proper location of the stream of blanks or workpieces 176 in the channel 174. These detents are similar to each other and are formed as an angular device 184 pivoted at the end of one leg at 186 and having the other leg extended toward the channel. At their free ends 188 these latter legs are V-shaped in formation to engage the cylindrical surface of the pipe couplings. It will be recognized that other end formations could be used for other types of workpieces, however. Leaf springs 190 fixed to the frame of the injector urge the lever ends 188 into holding contact with the blanks 176. The upper lever thus prevents any of the blanks from following the plunger 172 on its return stroke, and the lower one holds the lowermost blank from interfering with the rotation of the work holder mechanism.

The primary structure of the work holder 84 is comprised of three plates: a face plate 192 (FIG. 3), a carrier plate 194 and a spider 196. The carrier is of considerable thickness in order to accommodate the length of the couplings 176. A wrench mechanism 198 is loosely mounted in an opening 200 in the carrier 194, and is slidably disposed on a block 202. The block 202 is pivoted on a pin 204 pressed or threaded into the face plate 192. Thus, the wrench has a required amount of freedom of motion.

The block 202 extends into a rectangular opening 206 in a base member 208. A tongue 210 is formed on this member extending outwardly and formed with a serrated jaw 212 diagonally across an upper corner. A movable jaw member 214 having two arms 216 embracing the tongue 210 is pivoted thereto by a pin 218. A serrated jaw 220 is formed on this member spaced from the jaw 212 approximately the diameter of the pipe coupling to be threaded. A spring 222 urges the jaw member 214 upward around the pivot 218 and therefore in a direction to close the jaws. It will be further apparent to those skilled in the art that, because of the location of the pivot point with respect to the jaws, any tendency of the work piece to turn in one direction causes the work to be clamped more tightly in the jaws. Thus, as the tap is threaded through the blank, it is turned in a direction to tighten the holding of the jaws, thus assuring proper holding of the blank. However, as the piece is injected into the wrench, it first hits the edge of the jaw 220, and because of the direction of movement of the work holder, the jaw opens and the workpiece is free to slide in.

Figure 3:
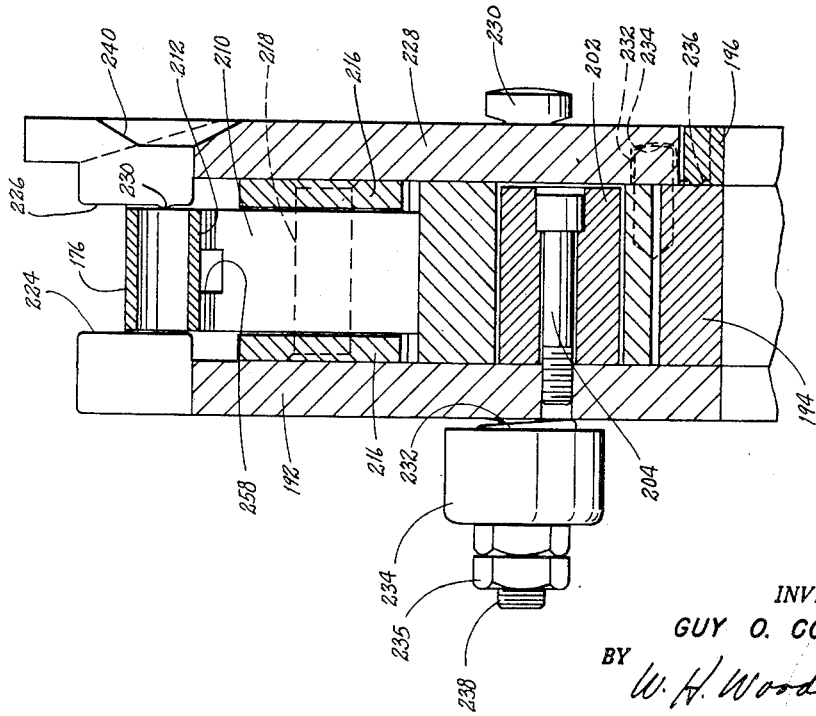
FIG. 3 is a sectional view along line 3—3 of FIG. 2 on an enlarged scale.

An anvil 224 is formed on the face plate 192 in position to engage a blank held in the wrench, and a corresponding anvil 226 is formed on a clamping member 228 (FIG. 3). A slight ridge 230 is formed on the latter anvil to assure that the blank 176 will be flat against the face plate anvil 224 and not be urged to align itself with the clamping member 228 which is movable.

Because of the size of the wrench mechanism 198, the clamping member 228 must be quite wide. Provision is made therefore to pivot it at the corners. A pair of dowel pins 232 are pressed into the liner and extend into holes 234 in the clamping member. These pins are formed with rounded ends on which the member 228 may pivot, but it is preferred that small ridges 236 be formed near the inner edge of the member 228 as fulcrums, and that the dowels be merely guides to hold the clamp in proper position. The clamp is urged to a closed position by a pair of bolts 238 having heads 239. The bolts 238 extend through the clamping member 228, the carrier 194 and the face plate 192 and are held against the clamp 228 by a spring 232 engaging the face plate and a cup 234 which acts as a washer and a guard for the springs. Jammed nuts 235 preserve the proper adjustment of compression in the spring 232. A slot 238 (FIG. 2) and a hollow 240 are formed in the clamp 228 to provide clearance for the tool and head respectively.

Novel discharge means for the finished product is also provided herein. A channel 242 just large enough to pass the finished piece extends through the movable jaw 214, and communicates with a similar channel 244 in the carrier plate 194. These channels form a continuous passage from the jaws 212 and 220 to the outside of the plate and, therefore, provide a passageway for a workpiece, to the periphery of the plate. A detent jaw member 246 is provided to partially obstruct the channel 244 at its outlet to prevent undesired release of the pieces.

Positive means for discharging the pieces includes a ram 248 driven by a connecting link 250 from a crank device 252. This mechanism is actuated in timed relation to the turning of the work holder mechanism by a pinion 254 similar to the pinion 154 and meshed with the same ring gear 178 (FIG. 1). This mechanism thus is timed to operate each time a clamp comes around. The ram 248 is slidably journalled in a guide member 256 which conveniently may be bolted to the frame of the machine. Each of the jaws 212 and 220 is formed with a channel 258 (FIG. 3) to allow the ram to push the workpiece from between the jaws as shown in FIG. 2.

The workpieces are discharged from the channel 244 into a chute 260 from which they may fall into boxes or kegs, or the like. This discharge is caused by the ram 248 striking the piece between the jaws 212 and 220 and forcing it into the channel 242. In order to accomplish this with the use of as little force as possible, the ram is formed with a sloping surface 262 which first strikes the piece and tends to move it circumferentially as well as radially. The circumferential motion has the effect of causing the jaw member 214 to rock about its pivot 218 and open the jaw. At the same time, the piece passes into the channel 242 and forces the last piece in the channel 244 past a corner 264 of the detent 246 and out into the chute 260. Thus the workpieces are positively injected and ejected.

A tool which may be used in my machine to cut tapered threads, particularly on the larger sizes of pipe couplings, is shown in FIGS. 5, 6 and 7. In this form of spindle, the rotating part takes the form of a tube 266 which is journalled in a follower block 268 similar to the follower block 126 (FIG. 1) previously described having the same rollers and drum cam formation. The spindle is also journalled in the spindle supporting member and the end walls, as described in connection with FIG. 1. While the bearings shown in the drawings are simple journal bearings, it will be recognized that preloaded bearings such as those described heretofore may be used with the advantages there set out. The spindle 266 is also driven in the same manner as that originally described, and therefore, the drive means is not shown in FIG. 5.

A collapsing tap is fastened at the working end of the spindle. This tap is formed with a tubular collar 270 attached to the tube 266 and carrying a series of thread cutting dies 272 formed to cut the desired thread and disposed in slots 274 cut in the tap. Thus the dies are supported in a manner similar to the dies carried in a plumber's die holder for the external threading of a pipe. The slots 274 are open at the end, and posts 276 which define the slots are supported by a plate 278 screwed to the outer end thereof. It is obvious that the amount of taper, if any, of the threads to be cut is a matter of choice and not part of the invention.

Internally of the tap body, or collar 270, among the posts 276, is disposed a collapsing cam 280. In cross section as shown in FIG. 6, this cam is shaped like a swastika, having a central body with four extending legs and, extending at right angles from the legs, cam lands or feet 282. These lands slope in a longitudinal direction (FIG. 7) being nearest the axis at the extending end and sloping outwardly towards the collar 270. Grooves 284 are formed in the dies 272 and match the cam lands 282 in slope. Thus each die is held in position radially by the engagement of the land 282 in the groove 284. This radial position may be varied, however, by the longitudinal position of the cam 280. In this embodiment, the parts are formed so that when the cam 280 is extended to the left (FIG. 5) to its furthest position, the dies 272 are in proper cutting position to form the threads of the size desired. When the cam is retracted to its furthest right position, as shown in FIG. 7, the dies will be retracted completely from the threads which they are cutting.

The cam 280 is rotated with the rest of the tap by the spindle. Positive rotation is assured by the use of a key 286 engaged in a keyway in the collar 270 and slidably engaged in a keyway in a tang 288 on the cam member 280. Longitudinal motion of the cam is controlled by a central shaft or bar 290 slidably disposed centrally of the spindle. This bar does not rotate, as will appear hereinafter, and therefore it is necessary that means be provided between the cam 280 and the bar 290 to allow relative rotation therebetween while still allowing the bar to control the longitudinal position of the cam. One such means is illustrated in FIG. 5. A headed bolt is rotatably journalled in the shaft 290. Suitable bearing material 292 surrounds the circular head 293 of the bolt particularly so that it will run free. A nut 296 surrounding the bolt stem 298 may also be made of a bearing bronze for additional bearing surface. The bolt is threaded into the tang 288 on the cam and is prevented from inadvertent rotation relative thereto by a pair of jammed set screws 300 threaded into the tang 288 and engaging the threads of the bolt.

Longitudinal movement of the shaft 290 is controlled by cam means mounted on the inner wall of the standards 14. At the end adjacent the standards, the shaft 290 is cut away on two sides to form a flattened tongue 302. A pair of rollers 304 are journalled on a shaft 306 extending through the tongue. The rollers 304 engage in identical cam grooves 308 formed in track members 310 attached to the standard 14. Rotation of the shaft 290 is prevented by the engagement of the end of the flattened tongue 302 in a groove 312 of a track member 314 also fastened to the standard 14.

The cam grooves 308 follow the drum cam ridge 150 generally until the requisite number of threads has been cut in the workpiece. At that point, the cam 308 retracts the shaft 290 and therefore the cam 280. This collapses the dies 272, freeing the spindle from the workpiece and allowing it to be withdrawn. After the tap is withdrawn from the workpiece, the shaft again causes the cam 280 to move the dies 272 to their cutting position and the cycle begins again. It will be obvious that the track member 314 must either follow the cam, or that the groove 312 formed therein must be deep enough to retain control of the tongue 302 at its furthest extension and retraction. It will be apparent that, in threading very short couplings where the threads extend from each end substantially to the center of the device, the dies may be inserted into the workpiece alternately; that is, the die from one end may complete its thread cutting operation and be withdrawn as the second die is completing the threading from the opposite end.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. In a forming machine having a base, a spindle holding member mounted on said base, a work holder mounted on said holding member adapted to hold a workpiece, and drive means adapted to rotate said holding member; spindle means for said machine comprising a spindle member adapted to be driven rotatably by said drive means, cam means on said base and follower means on said spindle member to control the longitudinal position of said spindle during advance toward a workpiece and withdrawal therefrom, a tool body fixed to said spindle, radially movable forming dies disposed in said body, cam means operatively engaging said dies, said cam means being rotatable with said body, rod means journalled centrally of said spindle member, said cam means having a part rotatably journaled but longitudinally fixed in said rod means, follower means on said rod means, and cam means on said base engaging said last named follower means to control the longitudinal position of said rod means and thereby the radial position of said dies.

2. In a forming machine having a fixed base, a rotary driven shaft in said machine, a disk-shaped work holder fixed to said shaft, a jaw at the periphery of said work holder adapted to clamp tubular workpieces therein such that an end of such workpieces is accessible to a threading tool, a spindle holding member, a spindle journalled for rotation in said holding member such that it is coaxial with the axis of said jaws, means for rotating said spindle about said rotary driven shaft in synchronism with said work holder, a thread forming tool carried by said spindle, said tool having retractable forming dies therein, means for rotating said spindle, cam means for reciprocating said spindle to advance said tool through a workpiece and retract the same therefrom after a threading operation, a rod within said spindle mounted for reciprocation therein, said rod having a cam follower and being operatively connected to said dies for controlling the radial position of said dies within said tool, and a cam mounted in said base operatively associated with said follower for moving said rod axially within said spindle to project and retract said dies as said cam follower moves in contact with said cam during rotation of said spindle and said rod about said rotary driven shaft.

3. In a forming machine, a rotary driven shaft in said machine, a disk-shaped work holder fixed to said shaft, a jaw at the periphery of said work holder adapted to clamp tubular workpieces therein such that an end of such workpieces is accessible to a threading tool, a spindle holding member, a spindle journalled for rotation in said holding member such that it is coaxial with the axis of said jaws, means for rotating said spindle about said rotary driven shaft in synchronism with said work holder, a thread forming tool carried by said spindle, said tool having retractable forming dies therein, means for rotating said spindle, cam means for reciprocating said spindle to advance said tool through a workpiece and retract the same therefrom after a threading operation, a rod within said pindle rotatably connected to said tool for controlling the radial position of said dies within said tool, and a fixed cam associated with the end of said rod remote from said tool for moving said rod axially within said spindle to project and retract said dies.

4. In a forming machine having a fixed base, a rotary driven shaft in said base, a disc-shaped work holder fixed to said shaft, a jaw at the periphery of said work holder adapted to clamp tubular workpieces therein such that an end of such workpieces is accessible to a threading tool, a spindle holding member, a spindle journalled in said holding member such that it is co-axial with the axis of said jaw, means for rotating said spindle about said driven shaft in synchronism with said work holder, a thread-forming tool carried by said spindle, said tool having radially moving forming dies therein, means for rotating said spindle on its axis, cam means for reciprocating said spindle to advance said tool through a workpiece and retract the same therefrom after a threading operation, a rod mounted for reciprocation within said spindle operatively connected to said dies for controlling the radial position of said dies within said tool, a cam mounted on said fixed base, and a cam follower carried by said rod and in contact with said cam for moving said rod axially within said spindle during rotation of said spindle holder whereby said dies are radially operated.

References Cited in the file of this patent

UNITED STATES PATENTS

| | | |
|---|---|---|
| R. 14,086 | Daniels | Mar. 14, 1916 |
| 377,400 | Miller | Feb. 7, 1888 |
| 2,264,106 | White | Nov. 25, 1941 |
| 2,291,744 | Nell | Aug. 4, 1942 |
| 2,324,879 | Robertson | July 20, 1943 |
| 2,557,069 | Berkey | June 19, 1951 |
| 2,820,973 | Farmer | Jan. 28, 1958 |